Patented Oct. 13, 1931

1,827,219

UNITED STATES PATENT OFFICE

ERNEST M. BROGDEN, OF WINTER HAVEN, FLORIDA, ASSIGNOR TO BROGDEX COMPANY, OF WINTER HAVEN, FLORIDA, A CORPORATION OF FLORIDA

ART OF PRESERVING FRESH FRUITS

No Drawing. Application filed November 20, 1922. Serial No. 602,240.

This invention relates to art of preserving fresh fruit; and it relates more particularly to a process or method of preservatively treating fresh fruits that are ordinarily picked before they are fully ripe, the treatment according to the present invention being such as to greatly facilitate and simplify the handling of such fruits in getting them to market and also to enable the picking or harvesting to be delayed until the fruit has attained a greater degree of maturity or ripeness than has been permissible in prior practice. Moreover, the invention in one of its especially advantageous embodiments provides for so regulating and controlling the rate at which the fruit ripens or matures after it is picked that the final ripening or maturing may be prevented from becoming complete until after the lapse of a period of time that can be variably predetermined with sufficient accuracy for practical purposes.

It has been essential heretofore in the commercial handling of many fruits and vegetables to pick or harvest the same while still very green or unripe in order to get them to market in saleable condition. Well known examples of fruits customarily so harvested are pears, plums, peaches, melons (e. g. watermelon, cantaloupe) etc., as well as vegetables such as tomatoes. Fruits so harvested and handled undergo further ripening and maturing between the time of harvesting and the time of sale to the ultimate consumer; but it is a well known fact that the flavor and general condition of fruit ripened or matured under these conditions is much inferior to that of fruit that is allowed to ripen or mature to a greater extent on the tree or vine. However, it has not been feasible heretofore to await such further ripening and maturing before harvesting because, unless the fruit was to be consumed strictly locally, it was not possible to get such further ripened fruit to market and dispose of it quickly enough to avoid prohibitive losses. This has been true notwithstanding employement of modern methods of refrigeration and other precautions and safeguards customarily adopted in the handling and shipment of fruit. Refrigeration has also been almost universally employed in the shipment of fruits even when picked green, since otherwise the losses, which are rather high under the most favorable conditions of the prior practice, are apt to be prohibitive.

It is an important general object of the present invention to obviate the drawbacks and disadvantages characterizing the prior practice of fruit handling and shipment, especially as regards handling and shipping fruit of the character above specified which is customarily picked in green or immature condition as set forth. Further and more specific objects are to enable allowing such fruits to attain a materially greater degree of ripeness or maturity before harvesting while at the same time ensuring their arrival in market in fresh sound condition and with good keeping qualities; to enable control or regulation of the final stage of the maturing or ripening of the fruit in such manner that the period of time which such fruit will keep under given conditions can be fixed and predetermined within reasonable limits at the will of the shipper; and to enable refrigeration to be dispensed with, if desired, whether the fruit be harvested very green as heretofore or in more mature condition as is the case in the best embodiment of the present invention. Other objects and advantages of the invention will appear more fully hereinafter as the description proceeds.

For the sake of convenience, the term "fruit" as employed in the appended claims, which point out the invention more particularly, will be used in a broad sense, unless otherwise indicated, to include not only fruits in the narrow sense in which this word is commonly used but also vegetables (e. g. tomatoes) which are susceptible of being treated in accordance with the process of the invention. However, for the purpose of explaining the underlying principles of the invention by means of a concrete illustrative example, typical of the broad scope thereof, the treatment of certain specific fruits will be more particularly referred to and described hereinafter with the understanding that the scope of the invention is not thereby limited.

Pears are typical of fruit that may be advantageously treated in accordance with the principles of the invention. As is well known, in the commercial handling and marketing of pears as heretofore practiced, they are picked in an unripe or immature condition technically known as "hard-green". In this condition the pears are very hard indeed, have not begun to "color", and are quite unfit for food. After picking, the pears are individually wrapped very carefully in tissue paper and shipped in special types of cars under refrigeration, or in the holds of vessels equipped with refrigerating plants. By the time the fruit arrives at market, say in from a week to two weeks on the average, it has begun to color very perceptibly, that is, to turn yellow. After removal from the car or ship hold, the fruit softens and deteriorates with great rapidity, and unless disposed of within a few days it is too soft and rotten to be saleable. Thus, where the receipts of such fruit in a given market happen to be larger than normal on a certain day, it is often necessary to dispose of it at unprofitable prices in order to avoid the danger of its being a total loss.

According to the present invention, the disadvantages of the prior practice are overcome by providing the fruit, pears in the typical case assumed, with a thin coating or film of a suitable preservative material that seals the pores of the rind or skin sufficiently to prevent deterioration of the fruit but without preventing the fruit from ripening and maturing at a rate that is much slower, however, than in untreated fruit. The rate of maturing or ripening can be controllably varied by varying the composition of the preservative material or the thickness of the coating thereof that is applied to the fruit. In general the preservative material should be more or less oily in character, and the material should most advantageously include dissolved in or intimately mixed therewith, or both, a waxy substance. The preservative material should of course be substantially inert toward and without harmful action upon the fruit itself and should also be harmless to human beings. Preservative material especially well adapted for the purposes in view comprises in a typical instance a composition resulting from intimate commixture of paraffin and a refined mineral oil, the mixture or composition having a consistency such that it can be spread, as by thoroughly rubbing with the aid of rapidly revolving brushes, in a thin film over the surface of the fruit treated. For best results it is desirable to use a well refined substantially pure paraffin wax such as can be readily obtained commercially. The mineral oil may vary considerably in its physical characteristics depending upon the particular results it is desired to produce; but in general a fairly light refined mineral oil of the type obtainable from petroleum and having relatively low viscosity is at present considered most desirable to employ. The oil may or may not be volatile at ordinary temperatures, either type giving good results under appropriate conditions. In either case it is desirable to have the oil as free from color, odor and taste as is possible under the circumstances, although this consideration is of less importance where the oil is volatile and therefore leaves the fruit for the most part very soon after application thereto. Where the oil employed is a volatile oil, it may comprise any one or more of the volatile light oil fractions resulting from distillation of petroleum. As typical of such volatile fractions may be mentioned petrolic ether and gasolene. A well refined kerosene will also serve and may for convenience be here classed as a partly volatile solvent although it contains certain constituents that are much less volatile than the lighter fractions before mentioned. A suitable light oil of the kerosene type may have, in a typical instance, a gravity of $42°-44°$ Baumé, a boiling or distillation range of $360°$ to $486°$ F., and a flash point of about $149°$ F. Among the non-volatile mineral oils well adapted for use in the practice of the invention may be mentioned especially what are known commercially as white oils, some of which are used, for example, in various forms for medicinal purposes. A typical colorless or white oil in the nature of a liquid petrolatum, which is also tasteless and odorless and which has been found to be especially suitable in the practice of the present invention, has the following characteristics:

Specific gravity_____ 0.840
Viscosity at 100° F._____ 70–73 seconds
Flash point_____340°–350° F.
Initial distillation point_____ 600° F.
End distillation point_____ 745° F.

It is to be understood that the oils hereinabove specifically mentioned are referred to only as particularly advantageous examples of oils that can be employed, and that the invention is not restricted thereto.

Where paraffin is employed as the waxy constituent of a mixture including one or more oils such as those above mentioned, the proportions of the ingredients vary in accordance with the length of time it is desired shall elapse between the application of the mixture to the fruit and the complete ripening thereof. In general it may be stated that the thicker the coating remaining permanently on the fruit as a result of the treatment, the longer will be the time required for the fruit to completely ripen or mature; although it is to be understood that even the thickest coating that is applied to the fruit in carrying out the invention is actually very thin indeed, being ordinarily in the nature of a film of such slight thickness as hardly to be noticeable on the fruit. Where the consistency of the preservative material or composition is relatively thin and fluent, approaching a liquid in character, the material can be more readily spread upon the fruit in a film of minimum thickness than where the preservative material has a substantially thicker consistency; although in both cases the absolute thickness of the resulting film coat should be very slight. Accordingly, where it is desired to retard the ripening or maturing of the fruit to the maximum extent desired or practicable, a preservative material of relatively thick consistency is employed, and correspondingly, where it is desired that the fruit mature within a comparatively short time after treatment, a mixture of much thinner consistency is used.

Assuming now that pears are to be prepared for market in accordance with the invention, the best practice is to allow the pears to remain on the tree until they are hard-ripe. In this condition they are still too hard to eat but have begun to color somewhat, that is, they have begun to turn yellow slightly. At this stage they have attained practically their full growth as well as full development of juice and flavor. For pears in this condition to complete their ripening or maturing and become edible, it is only necessary that they undergo a softening or mellowing process, during which process the typical yellow color of the ordinary pear is also fully developed. Without treatment in accordance with the invention, this change would occur very quickly after the hard-ripe fruit had been picked, say usually within a week or less. However, according to the present invention, the hard-ripe pear is treated as soon as possible after it is picked with a preservative sealing material of the character above described. In this instance let it be assumed that it is desired to treat the pear so that it will remain sound and in salable condition for a period of say six weeks or so, which is about the maximum period that is ordinarily necessary in actual practice. For this purpose a mixture consisting of say 20 parts by volume of refined paraffin wax and 80 parts by volume of a non-volatile white oil such as that of which the physical constants are hereinabove set forth can be used to advantage. Such a mixture can be made by melting the paraffin and heating to around 140° F., and then gradually running the white oil (which may also be heated) into the hot molten paraffin with constant stirring; or streams of the molten paraffin and oil may be simultaneously run into a mixing vessel. The mixture may desirably be subjected to high-speed agitation while cooling to produce an emulsified or homogenized composition. The resultant mixture, at ordinary room temperature, is a smooth emulsion-like whitish composition that is of soft consistency and amply fluent to allow its being spread in a thin film-like coating upon a surface when properly applied thereto. A small quantity of this mixture is applied to the pear in any suitable manner and is then spread thoroughly and uniformly all over the surface of the pear by any appropriate means that will ensure leaving only a very thin film-like coating thereon. In practice this can usually be best effected by means of rotary brush rolls having hair or fiber bristles, such as the brush rolls of a fruit polisher of a type well known as to its general form. Apparatus eminently suitable for applying the coating composition to the fruit and brushing or rubbing it out into a thin film on the surface thereof is described, for example, in my prior application Serial No. 529,080, filed January 13, 1922, and also in the application of Homer C. Ricketts Serial No. 538,424, filed February 23, 1922. As the precise character of the rubbing or brushing apparatus is not material to the present invention, other than that it satisfy the general requirement that it shall enable rubbing the fruit thoroughly to ensure production of a preservative film of the necessary thinness, it is unnecessary to describe the same further here.

Assuming now that a much shorter delay in the maturing of the fruit is desired, say three weeks for instance, a very much thinner mixture of oil and paraffin wax should be used. For example, a composition obtained by mixing 10 volumes of wax with 90 volumes of a volatile mineral oil solvent, such as a technical grade of petrolic ether having a distillation range of 70° to 140° C., is suitable for this purpose. This mixture or solution is very much thinner and more liquid at ordinary temperatures than that just described hereinabove, and pears treated therewith in the manner set forth retain a still thinner protective film and keep for a much shorter period of time.

For intermediate delay periods, preservative compositions of intermediate consistencies and compositions may be used. Thus, for a five weeks delay in the maturing of pears picked at average hard-ripeness a mixture of 15 parts by volume of paraffin wax and 85 parts by volume of the 0.840 specific gravity white oil before mentioned is appropriate. Substantially similar results can be obtained with a mixture of 20 parts by volume of paraffin wax with 60 parts of the aforesaid white oil and 20 parts of petrolic ether. For a delay of four weeks, a mixture of say 12½ parts of paraffin wax and 87½ parts of the aforesaid white oil is suitable; or a mixture can be used containing 15 parts by volume of paraffin wax, 60 parts of the white oil and 25 parts of a volatile solvent such as petrolic ether. Application of the white oil alone to pears of the average hard-ripeness effects some retardation of ripening beyond the period that would be required for the untreated pears to mature, but this retardation is only slight and ordinarily amounts to not more than about a week or so as a rule. A similar short delay of retardation can be obtained by using, for example, a mixture consisting of 7 to 8% of paraffin wax with a volatile solvent such as petrolic ether.

It should be borne in mind that the specific figures above given for the extent of retardation or delay obtainable in the ripening or maturing of the fruit are intended to be taken in a relative sense rather than as necessarily numerically accurate. These figures are typical of what has been accomplished in treating certain well-known varieties of pears at a given stage of hard-ripeness and under certain conditions of handling and shipping, but variations in any of the numerous factors involved in commercial work will obviously affect the absolute amount of retardation or delay obtained in any given instance. In general, however, the foregoing gives an idea as to relative results obtainable in practicing the invention.

Fruit treated as above described may be shipped either with or without refrigeration to distant markets and arrives in sound condition. When it does finally soften sufficiently to become edible, it is noticeably superior in flavor to fruit that has been picked hard-green and handle under the practice formerly in vogue. The fact that such fruit holds or keeps very much better and more dependably than untreated fruit makes it unnecessary to dump abnormally large shipments of fruit on the market at a low price to prevent excessive loss from spoiling, and this is obviously of great importance to fruit shippers and dealers generally.

Although reference has been made more particularly to the treatment of pears that have been allowed to remain on the tree until hard-ripe, the advantages of the invention can also be realized to some extent at least when the treatment is applied to fruit even when picked hard-green as under the old practice. This is because the former necessity for shipping under refrigeration is eliminated by the present invention and the general conditions of the fruit as regards soundness is in any event much improved when treated as hereinabove described. In treating hard-green fruit, however, particularly hard-green pears, it is important not to use too thick a preservative composition, because the desired final ripening or maturing of the treated fruit may thereby be entirely prevented or delayed so long as render the fruit practically useless. In general, therefore, hard-green fruit should be treated with one of the thinner mixtures above specified in order to secure best results.

In applying the principles of the invention to treatment of non-globular fruits such as bananas, for example, to which the preservative composition cannot be conveniently applied on a commercial scale by rubbing or brushing, resort may be had to dipping the fruit in a liquid preservative material or composition. For example bananas which have heretofore been invariably picked very green for shipment can be allowed to remain on the tree for a materially longer period and the bunches can then be dipped at the place of shipment in a substantially liquid mixture or solution comprising paraffin and an oil vehicle. The composition should be of such thin consistency as will ensure leaving only a comparatively thin coating on the fruit even in the absence of the rubbing and brushing to which globular fruits are most desirably subjected when treated by the present process. Where a relatively long delay in ripening is desired, bananas for example can be dipped in a composition comprising about 25 volumes of paraffin wax and 75 volumes of a volatile light solvent such as petrolic ether, such a composition being a thin liquid suitable for dipping at ordinary temperatures. For a somewhat shorter delay, dipping the fruit in a composition comprising about 10 parts of paraffin and 90 parts of a non-volatile white mineral oil of the character above described, parts being by volume, will give the desired result. Dipping the fruit in the white mineral oil alone, without any paraffin being used, will give a still shorter delay in ripening.

In carrying out the invention in another way, ordinarily not so desirable as the procedure hereinabove set forth in which the fruit is treated as soon as possible after picking, the fruit may on the contrary be shipped relatively green as heretofore and treated with a preservative composition of the character described only after arrival at the point of shipment. In this case the advantages of the invention are realized to the extent that the deterioration of the fruit that would otherwise take place after arrival at market is arrested and the period of final ripening or maturing is prolonged to a greater or less extent depending upon the formula of the preservative material or composition applied to the fruit.

Another advantageous feature of the novel method of the invention resides in the fact that a given lot or shipment of fruit, whether treated with the preservative composition before shipment or after arrival at its destination, may be divided up into several portions which may be separately treated with preservative compositions of differing formulae in order that the different portions into which the lot of fruit is divided may attain complete ripeness or maturity successively at different predetermined times. This enables the fruit to be placed on sale in successive portions instead of having to dispose of the whole lot within a given time.

Reference herein to pears is to be understood to include not only the more common varieties of pears but also the avocado (aguacate) or alligator pear which is produced more especially in tropical and semi-tropical regions and which can be treated to great advantage in accordance with the present invention.

What I claim is:

1. The method of treating fruit in preparing same for market which comprises coating incompletely ripened fruit with a composition that includes a solid protective material and a liquid vehicle, the proportions of the ingredients being adjusted to give a predeterminable delay in ripening.

2. The method of treating fresh fruit in preparing same for market which comprises applying to different portions of a lot of unripe fruit preservative material of differing composition whereby to delay ripening of the several portions for correspondingly differing periods.

3. In preparation of fresh fruit for market, the method of regulating the ripening of fruit which comprises substantially sealing the rind or skin of incompletely ripened fruit with a protective material in quantity adjusted according to the degree of ripeness of the fruit.

In testimony whereof I hereunto affix my signature.

ERNEST M. BROGDEN.